US007192666B2

(12) United States Patent
Calhoon (10) Patent No.: US 7,192,666 B2
(45) Date of Patent: Mar. 20, 2007

(54) APPARATUS AND METHOD FOR HEATING FUEL CELLS

(75) Inventor: John C. Calhoon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 10/729,691

(22) Filed: Dec. 5, 2003

(65) Prior Publication Data

US 2005/0123814 A1 Jun. 9, 2005

(51) Int. Cl.
*H01M 8/04* (2006.01)
*H01M 8/10* (2006.01)

(52) U.S. Cl. ............................ 429/23; 429/24; 429/22; 429/30

(58) Field of Classification Search ................. 429/13, 429/20, 23, 24, 26, 22, 30
See application file for complete search history.

(56) References Cited

U.S. PATENT DOCUMENTS 5,170,124 A * 12/1992 Blair et al. ................. 324/434
5,942,344 A * 8/1999 Lehmeier et al. ............. 429/13

OTHER PUBLICATIONS

Cabrera, A.L.; Kirner, J.F.; "A Rapid-Temperature-Cycling Apparatus for Oxidation Testing;" *Oxidation of Metals*; 1991; 35(5/6), 471-479.

Virkar, Anil V., et al., "The Role Of Electrode Microstructure On Activation And Concentration Polarizations In Solid Oxide Fuel Cells;" *Solid State Ionics*; 2000, 131(1-2),189-198.

Jimenez, R., et al., "Internal Diffusion Electrode-Electrolyte Contact Shape And Microstructure Effect On Solid Oxide Fuel Cells (SOFC) Oxygen Reaction;" *Boletin De La Sociedad Espanola De Ceramica Y Vidrio*; Sociedad Espanola Ceramica Vidrio, 1999; 38(6),625-629 (English abstract attached).

Tanaka, Kanako, "Study On High Efficiency Operation-Conditions of Solid Oxide Fuel Cell and Its System Evaluation;" *Kagaku Kogaku Ronbunshu*;1998;24(4),597-602 (English abstract attached).

Sakakaki, Keiji, et al., "Generation Efficiency of Solid Oxide Fuel Cell System With Fuel Recycling;" *Kagaku Kogaku Ronbunshu*, 1997, 23(2),292-295 (English abstract attached).

(Continued)

*Primary Examiner*—Patrick Joseph Ryan
*Assistant Examiner*—Thomas H. Parsons
(74) *Attorney, Agent, or Firm*—Woodcock Washburn LLP (57) ABSTRACT

A fuel cell or fuel cell stack heater using resistive heat. A resistive conductor (preferably some type of metal wire) is attached to a source of electricity such as a battery. The resistive conductor is in proximity with the fuel cell or stack so that when the resistive conductor is heated, the cell or stack will also become hot. An insulating material surrounds the outside of the fuel cell or stack, so that it encloses the cell or stack and the resistive conductor. The insulating material will capture heat from the resistive conductor and any waste heat given off by the operation of the fuel cell or stack. A means for modifying the amount of electrical current in the resistive conductor is attached to the apparatus. When the fuel cell or stack reaches the desired temperature, the means is employed to reduce or turn off current in the resistive conductor.

10 Claims, 7 Drawing Sheets

Resistive Heating Method for Starting a Fuel Cell

OTHER PUBLICATIONS

Dollard, W.J.; "Solid Oxide Fuel Cell Developments at Westinghouse;" *Journal of Power Sources*; Elsevier Sequoia, Switzerland, 1992, 37(1-2),133-139.

Best, F.G., "Miniature Combined Heat and Power System;" *Renewable Energy*; 1995,6(1),49-51.

Van Der Klein, C.A.M.; "The Fuel Cell: Developments and Perspectives;" *Energiespectrum Maart*; 1990,14(3), 77-82 (English abstract attached).

Jensen, J.; "The Need for Battery and Fuel Cell RAD;" *Energy Conservation by Energy Storage: Advanced Batteries and Fuel Cells—Proceedings of the Third Contractors Meeting*, Comm. European Communities, Luxembourg, 1983,166-172.

Fuel Cells, "A Basic Overview of Fuel Cell Technology", http://fuelcells.si.edu/basics.htm, 6 pages.

Alberta Research Council, Micro Solid Oxide Fuel Cell (µSOFC), http://www.arc.ab.ca/manu/micro_sofc.asp, 3 pages.

* cited by examiner

FUEL CELL

*(Prior Art)*

FIGURE 1

RESISTIVE HEATER CIRCUIT

INSULATION SURROUNDING FUEL CELL AND RESISTIVE CONDUCTOR

Resistive Heating Method for Starting a Fuel Cell

APPARATUS AND METHOD FOR HEATING FUEL CELLS

FIELD OF THE INVENTION

The present invention generally relates to fuel cells and more specifically relates to temperature control of fuel cells.

BACKGROUND OF THE INVENTION

A fuel cell is an electrochemical energy conversion device: it transforms chemical power into electrical power. A fuel cell typically converts hydrogen, $H_2$, and oxygen, $O_2$, into water, $H_2O$, producing electricity and heat. A fuel cell provides a direct current (DC) voltage that can be used to power motors, lights or any number of electrical appliances. Some types of fuel cells show promise for use in power generation plants. Others may be useful for small portable applications or for powering cars.

A single fuel cell typically generates a tiny amount of direct current (DC) electricity. In practice, many fuel cells are often assembled into a fuel cell stack. It is estimated that fuel-cell-powered cars will start to replace gas- and diesel-engine cars in about 2005. A fuel-cell car will be very similar to an electric car but with a fuel cell and reformer (for generating hydrogen) instead of batteries. Fuel cells will also be used in portable electronics such as laptop computers, cellular phones and hearing aids. In these applications, the fuel cell will provide longer life than a battery would, and will be "rechargeable" with a liquid or gaseous fuel.

Figure 1:
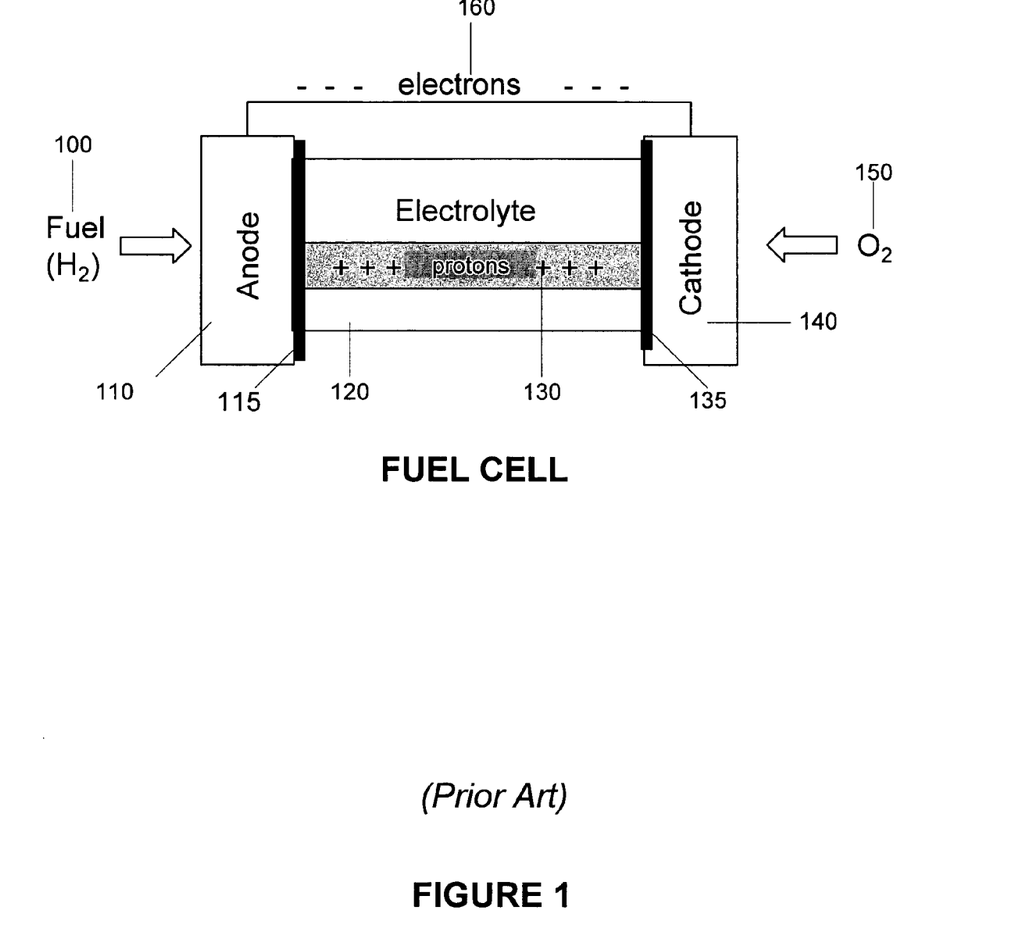
FIG. 1 is an illustration of an exemplary fuel cell (prior art)

FIG. 1 is an illustration of an exemplary fuel cell. A fuel cell comprises a pair of electrodes (anode 110 and cathode 140) and an electrolyte 120. The electrolyte 120 is typically positioned between the electrodes 110, 140. The electrolyte 120 functions as a conductor for carrying protons 130 between the electrodes 110, 140. In operation, a fuel, such as hydrogen 100, is fed into the anode 110 and oxygen 150 is fed into the cathode 140. The hydrogen 100 atoms, reacting with a catalyst 115 in the anode 110, split into protons 130 (which carry a positive charge) and electrons 160 (which carry a negative charge). The protons 130 are permitted to pass through the electrolyte 120 while the electrons 160 are not. Meanwhile oxygen 150 reacts with a catalyst 135 in the cathode 140 that splits the oxygen molecule 150 into two separate oxygen atoms bearing negative charges. The protons 130 pass through the electrolyte 120 towards the oxygen 150 in the cathode 140. The result is a build up of negative charge in the anode 110 due to the electrons 160 that were left behind. The electric potential due generated by this build up of electrons 160 is used to supply electrical power. Often, a fuel cell is equipped with a fuel reformer (not pictured here) that provides hydrogen 100 from a fuel source, such as natural gas, methanol, gasoline, or the like.

There are many different types of fuel cells, each using a different chemistry. Fuel cells are usually classified by the type of electrolyte they use. For example, Phosphoric Acid Fuel Cells (PAFCs) use phosphoric acid as an electrolyte, Molten Carbonate Fuel Cells (MCFCs) use molten carbonate as an electrolyte, Solid Oxide Fuel Cells (SOFCs) typically use a solid zirconium oxide and a small amount of ytrria as an electrolyte, and so on.

The ability of the various electrolytes to conduct protons from one side of the fuel cell to the other is temperature sensitive. Within the proper temperature range, an electrolyte will conduct protons (generally referred to as fuel ions) expeditiously, allowing the electrochemical process to occur rapidly, and thereby producing a greater electrical output. Below the proper temperature ranges, electrolytes will not conduct the fuel ions expeditiously, and the fuel cell will have less than ideal electrical output.

The proper temperature range for the fuel cell depends on the type of electrolyte involved. Some examples of proper operating temperatures for various types of fuel cells (including PAFCs, Proton Exchange Membranes (PEMs), MCFCs, SOFCs, Alkaline Fuel Cells (AFCs), Direct Methanol Fuel Cells (DMFCs) and the Protonic Ceramic Fuel Cells (PCFCs)) are listed below:

| | |
|---|---|
| PAFC: | 150°–200° C. |
| PEM: | 80° C. |
| MCFC: | 650° C. |
| SOFC: | 1000° C. |
| AFC: | 150°–200° C. |
| DMFC: | 50°–100° C. |
| PCFC: | 700° C. |

Due to the high operating temperatures of fuel cells, it is often necessary to heat them both prior to and during operation. Presently, fuel cells are mostly used in experimental environments, where heat is supplied by holding the cell over a flame or other source of heat. Heat may also be provided by preheating the oxygen that flows into the fuel cell. This requires an air preheat zone where oxygen can be heated prior to entry into the fuel cell. Such an arrangement expedites the heating of the cell or stack, and works well where there is plenty of space, such as in a lab or power plant. The above solutions are insufficient, however, if fuel cells requiring high operating temperatures are to be placed in limited space environments, such as inside electronic devices.

In addition to the standard methods for supplying heat to a fuel cell, the chemical reactions occurring in the fuel cell generate "waste heat" that is useful in keeping the fuel cell or stack of fuel cells hot. Waste heat is simply the heat given off by the chemical reaction of hydrogen and oxygen in the fuel cell. In the case of PEM type fuel cells, which operate at comparatively low temperatures, the fuel cell itself is capable of generating enough waste heat to maintain operating temperature. MEDIS TECHNOLOGIES® has developed an alkaline fuel cell that operates at room temperature. Most other fuel cell types require heat from an outside source, initially to establish the operating temperature of the fuel cell, and in some cases, to subsequently maintain the temperature of the cell. Supplying heat to these fuel cell types in limited space environments presents a challenge to the industry.

SOFCs, in particular, have very high operating temperatures (see above). SOFCs have some promise for use in electronic devices because the electrolyte material they employ is a solid, which lends itself to easier manufacture of small and durable fuel cells. However, the high operating temperature that they require presents a challenge to their eventual implementation in electronic devices. Historically, these fuel cells have been considered best suited for large-scale stationary power generators that could provide electricity for factories or towns. In fact, the high operating temperature of the SOFC has been capitalized on by using the heat to boil water. The steam produced can be channeled into turbines to generate more electricity.

If fuel cells, especially those requiring high operating temperatures, are to be used in limited space environments, there is a need to heat them with a system that requires little space and is controllable. Such a system must be sensitive to the requirements of the environment in which it is placed; if in an electronic device, it must not interfere with the operation of the device. It must also be sensitive to the safety of the device users. A heretofore unaddressed need exists in the industry to address the aforementioned deficiencies and inadequacies in heating fuel cells for specialized environments, such as may be found within computing devices.

SUMMARY OF THE INVENTION

A fuel cell or fuel cell stack heater in accordance with an embodiment of the present invention comprises a fuel cell or stack of fuel cells, and a resistive conductor (preferably some type of metal wire) attached to a source of electricity such as a battery or conventional power outlet. The resistive conductor is coiled around (or otherwise in proximity with) the cell or stack so that when the resistive conductor is heated, the cell or stack also becomes hot. An electric potential difference (voltage) generated by the source of electricity is then applied to the ends of the resistive conductor, and as electric current flows through the resistive conductor, the resistive conductor becomes hot, thereby transmitting heat to the fuel cell or stack. An insulating material is wrapped, sprayed, or otherwise applied to the outside of the fuel cell or stack, so that it encloses the cell or stack and the resistive conductor. The insulating material captures heat from the resistive conductor and any waste heat given off by the operation of the fuel cell or stack.

A current controller and corresponding mechanism(s) for modifying the amount of electrical current in the resistive conductor are attached to the apparatus. When the fuel cell or stack reaches the desired temperature, the current controller and corresponding mechanism(s) are employed to reduce or turn off current in the resistive conductor. In one embodiment, the current controller is capable of automatically and continuously monitoring the temperature and/or electrical output of the fuel cell or stack, and adjusting the current in the resistive conductor to maintain the desired temperature. While automation would be beneficial in many settings, the current controller need not be automated and could be controlled manually by a hand dial or similar input apparatus.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Apparatus and methods for heating fuel cells in accordance with the present invention provide for raising the temperature of a fuel cell or fuel cell stack to within the operational range of the electrolyte material 120 involved. As described above, the various fuel cell types are associated with various different electrolyte materials 120, and thus the present invention is not limited to any one particular type of electrolyte 120. Described herein is an exemplary embodiment using a Solid Oxide Fuel Cell (SOFC). It is to be understood, however, that the invention is applicable to any other type of fuel cell, not limited to those listed herein, wherein operation depends upon heating the fuel cell and/or temperature control.

The following nonexhaustive list provides a selection of fuel cell types to which the present invention could be applied. The list is included here to demonstrate that the term "fuel cell" is a general term that incorporates many different arrangements. The materials used in building the fuel cells vary, as do the types of fuel and the chemical processes that occur within the cell.

Phosphoric Acid Fuel Cell (PAFC): PAFCs can generate electricity at more than 40% efficiency. The PAFC utilizes a platinum electro-catalyst in its anode and the electrolyte is liquid phosphoric acid soaked in a matrix. At lower temperatures, phosphoric acid is a poor ionic conductor, and carbon monoxide poisoning of the platinum electro-catalyst becomes severe. Operating temperatures range from approximately 300 to 400 degrees F. (150–200 degrees C.). Thus, the PAFC produces steam as a byproduct. Approximately 85% of the steam generated by a PAFC can be used for cogeneration. Another advantage is that a PAFC can use impure hydrogen as fuel. PAFCs can tolerate a CO concentration of about 1.5%, which broadens the choice of acceptable fuels. Gasoline can be used as a fuel if the sulfur is removed. PAFCs generate relatively low current and power as compared to other types of fuel cells, and PAFCs are generally relatively large heavy. PAFCs can produce outputs up to 1 MW. The chemical equations describing reactions in the anode, cathode, and the fuel cell are provided below.

Anode: $H2(g) \rightarrow 2H+(aq)+2e-$

Cathode: $\frac{1}{2}O2(g)+2H+(aq)+2e- \rightarrow H2O(l)$

Cell: $H2(g)+\frac{1}{2}O2(g)+CO2 \rightarrow H2O(l)+CO2$

Proton Exchange Membrane (PEM): PEM fuel cells operate at relatively low temperatures (about 175 degrees F. or 80 degrees C.), have high power density, and can vary their output quickly to meet shifts in power demand. The PEM is a thin plastic sheet that allows hydrogen ions to pass through it. The membrane is coated on both sides with highly dispersed metal alloy particles (e.g., platinum) that are active catalysts. The electrolyte comprises a solid organic polymer, poly-perflourosulfonic acid. Hydrogen is fed to the anode side of the fuel cell where the catalyst encourages the hydrogen atoms to release electrons and become hydrogen ions (e.g., protons). The electrons travel in the form of an electric current that can be utilized before it returns to the cathode side of the fuel cell where oxygen has been fed. At the same time, the protons diffuse through the membrane (electrolyte) to the cathode, where the hydrogen atom is recombined and reacted with oxygen to produce water, thus completing the overall process. The PEM fuel cell is sensitive to fuel impurities. PEM fuel cell outputs generally range from approximately 50 to 250 kW. The chemical equations describing reactions in the anode, cathode, and the fuel cell are provided below.

Anode: $H2(g) \rightarrow 2H+(aq)+2e-$

Cathode: $\frac{1}{2}O2(g)+2H+(aq)+2e- \rightarrow H2O(l)$

Cell: $H2(g)+\frac{1}{2}O2(g) \rightarrow H2O(l)$

Molten Carbonate Fuel Cell (MCFC): The electrolyte of a MCFC comprises a liquid solution of lithium, sodium and/or potassium carbonates, soaked in a matrix. MCFC can provide fuel-to-electricity efficiencies, of approximately 60% normally (without cogeneration) and approximately 85% with cogeneration. MCFC operate at about 1,200 degrees F. or 650 degrees C. The high operating temperature is needed to achieve sufficient conductivity of the electrolyte. Because of this high temperature, noble metal catalysts are not required for the MCFC's electrochemical oxidation and reduction processes. Fuels for MCFCs include hydrogen, carbon monoxide, natural gas, propane, landfill gas, marine diesel, and simulated coal gasification products. The chemical equations describing reactions in the anode, cathode, and the fuel cell are provided below.

Anode: $H2(g)+CO32- \rightarrow H2O(g)+CO2(g)+2e-$

Cathode: $\frac{1}{2}O2(g)+CO2(g)+2e- \rightarrow CO32-$

Cell: $H2(g)+\frac{1}{2}O2(g)+CO2(g) \rightarrow H2O(g)+CO2(g)$

Solid Oxide Fuel Cell (SOFC): A SOFC typically uses a hard ceramic material of solid zirconium oxide and a small amount of ytrria, instead of a liquid electrolyte, allowing operating temperatures to reach 1,800 degrees F. or 1000 degrees C. Power generating efficiencies can reach approximately 60% (without cogeneration) and 85% with cogeneration. Power output can be as high as approximately 100 kW. One type of SOFC comprises an array of meter-long tubes. Tubular SOFCs have produced as much as 220 kW.

Because the electrolyte material used in SOFCs is a solid, the SOFC is a good candidate for the production of battery-sized fuel cells for portable devices. The chemical equations describing reactions in the anode, cathode, and the fuel cell are provided below.

Anode: $H2(g)+O2- \rightarrow H2O(g)+2e-$

Cathode: $\frac{1}{2}O2(g)+2e- \rightarrow O2-$

Cell: $H2(g)+\frac{1}{2}O2(g) \rightarrow H2O(g)$

Alkaline Fuel Cell (AFC): AFCs can achieve power generating efficiencies of up to approximately 70 percent. The operating temperature of an AFC is from approximately 300 to 400 degrees F. (about 150 to 200 degrees C.). AFCs use an aqueous solution of alkaline potassium hydroxide soaked in a matrix as the electrolyte. AFCs typically provide a cell output from approximately 300 watts to 5 kW. The chemical equations describing reactions in the anode, cathode, and the fuel cell are provided below.

Anode: $H2(g)+2(OH)-(aq) \rightarrow 2H2O(l)+2e-$

Cathode: $\frac{1}{2}O2(g)+H2O(l)+2e- \rightarrow 2(OH)-(aq)$

Cell: $H2(g)+\frac{1}{2}O2(g) \rightarrow H2O(l)$

Direct Methanol Fuel Cell (DMFC): DMFCs are similar to PEM cells in that they both use a polymer membrane as the electrolyte. However, in the DMFC, the anode catalyst itself draws the hydrogen from the liquid methanol, eliminating the need for a fuel reformer. Efficiencies of about 40% are expected with a DMFC. The DMFC can typically operate at a temperature between approximately 120–190 degrees F. or 50–100 degrees C. Higher efficiencies are achieved at higher temperatures. The chemical equations describing reactions in the anode, cathode, and the fuel cell are provided below.

Anode: $CH3OH(aq)+H2O(l) \rightarrow CO2(g)+6H+(aq)+6e-$

Cathode: $6H+(aq)+6e-+3/2O2(g) \rightarrow 3H2O(l)$

Cell: $CH3OH(aq)+3/2O2(g) \rightarrow CO2(g)+2H2O(l)$

Regenerative Fuel Cells: Regenerative fuel cells are attractive as a closed-loop form of power generation. Water is separated into hydrogen and oxygen by a solar-powered electrolyser. The hydrogen and oxygen are fed into the fuel cell which generates electricity, heat and water. The water is then re-circulated back to the solar-powered electrolyser and the process begins again.

Zinc-Air Fuel Cells (ZAFC): In a typical zinc-air fuel cell, there is a gas diffusion electrode (GDE), a zinc anode separated by electrolyte, and some form of mechanical separators. The GDE is a permeable membrane that allows atmospheric oxygen to pass through. After the oxygen has converted into hydroxyl ions and water, the hydroxyl ions travel through an electrolyte, and reach the zinc anode. At the zinc anode, the hydroxyl ions react with the zinc, and form zinc oxide. This process creates an electrical potential. When a set of ZAFC cells are connected, or stacked, the combined electrical potential of these cells can be used as a source of electric power. ZAFCs can be used in a closed-loop system. In this closed-loop system, electricity is created as zinc and oxygen are mixed in the presence of an electrolyte, creating zinc oxide. Once fuel is consumed, the system is connected to the grid and the process is reversed, leaving once again pure zinc fuel pellets. This reversing process takes only about 5 minutes to complete. An advantage possessed by zinc-air technology over other battery technologies is its high specific energy, which is a factor used to determine the running duration of a battery relative to its weight.

Protonic Ceramic Fuel Cell (PCFC): The PCFC comprises a ceramic electrolyte material that exhibits high protonic conductivity at elevated temperatures. PCFCs share the thermal and kinetic advantages of high temperature operation at approximately 700 degrees C. with molten carbonate and solid oxide fuel cells, while exhibiting all of the intrinsic benefits of proton conduction in polymer electrolyte and PAFCs. The high operating temperature helps to achieve very high electrical fuel efficiency with hydrocarbon fuels. PCFCs can operate at high temperatures and electrochemically oxidize fossil fuels directly to the anode. This eliminates the intermediate step of producing hydrogen through the reforming process. Gaseous molecules of the hydrocarbon fuel are absorbed on the surface of the anode in the presence of water vapor, and hydrogen atoms are efficiently stripped off to be absorbed into the electrolyte, with carbon dioxide as the primary reaction product. Additionally, PCFCs have a solid electrolyte so the membrane does not dry out as with PEM fuel cells, or liquid can't leak out as with PAFCs.

Each of the above fuel cell types can be assembled into a stack for more practical and efficient generation of larger quantities of electricity than that of a single fuel cell acting alone. Although fuel cell stacks are typically made up of multiple fuel cells of the same type, there is no reason the present invention, in combination with the appropriate electronics, could not be used to heat stacks of fuel cells, each stack being made of fuel cells of different types, or multiple stacks of fuel cells, each individual stack being homogeneously made up of any type of fuel cell.

Figure 2:
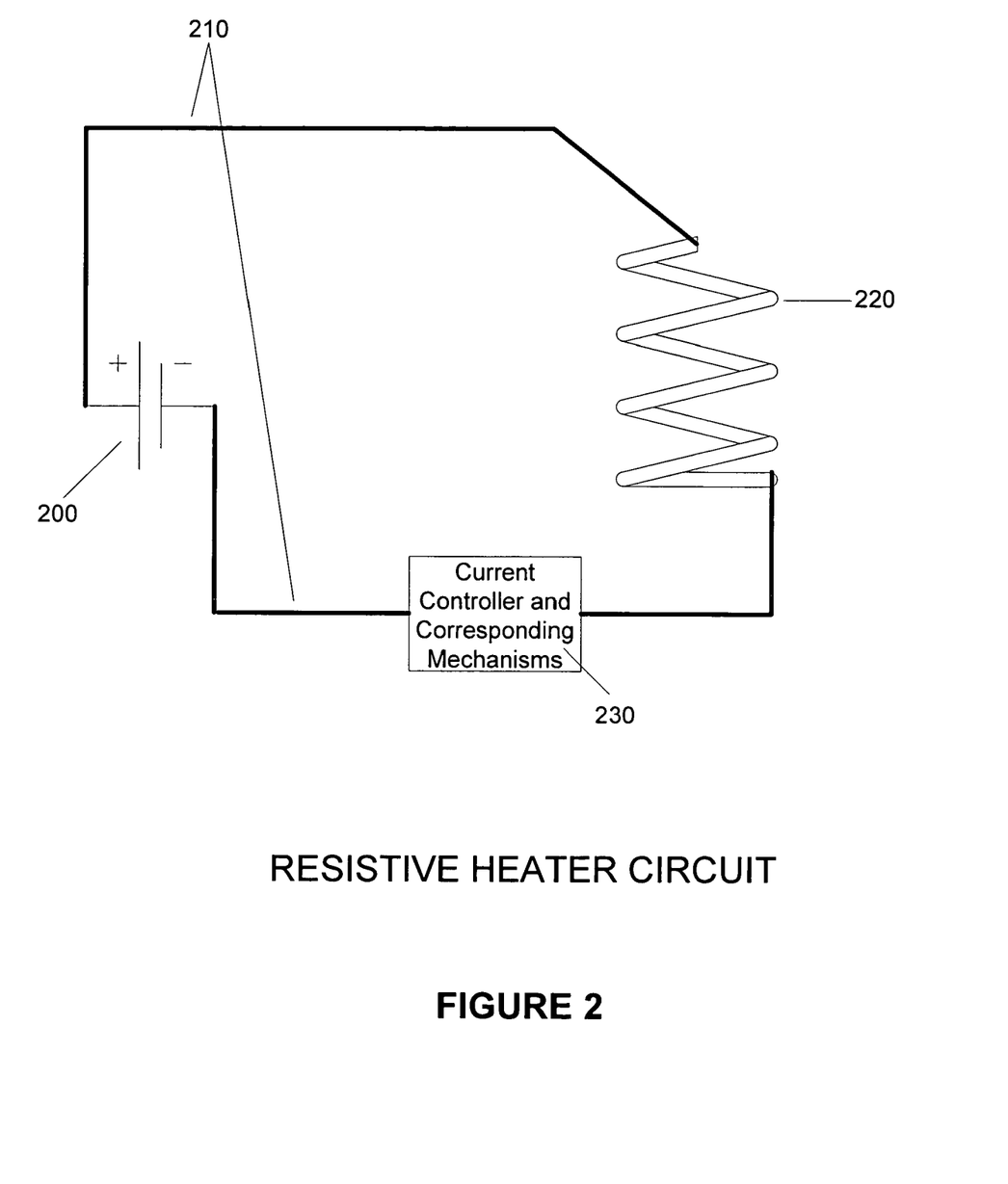
FIG. 2 is an illustration of a resistive heater circuit, which is used in conjunction with the fuel cell of FIG. 1 to heat the fuel cell.

The fuel cell or fuel cell stack, as described above, is then heated with a resistive heater circuit, which is shown in FIG. 2. Referring to FIG. 2, a typical resistive heater circuit comprises a source of electricity 200, connectors 210, and a resistive conductor 220 which is configured in such a way as to best deliver heat.

The source of electricity 200 could be either AC or DC. It could be a battery, a fuel cell or fuel cell stack, a power cord connected to a conventional wall plug, or any other source of electricity. The connectors 210 serve to transmit electricity to the resistive conductor 220. If it is desired that the connectors 210 generate heat, they may also be made from the same material as the resistive conductor 220. If it is desired that the connectors 210 do not generate heat, they may be made from some other material designed to minimize the amount of heat lost between the connectors 210 and the resistive conductor 220. The resistive conductor 220 is either in close proximity or in contact with the fuel cell of FIG. 1. A resistive conductor 220 can be made of any material that conducts electricity, and thereby generates heat. Metal, frequently copper and aluminum-based alloys, are often used as resistive conductors 220, but any conductor of electricity will generate heat. The present invention is not limited to any particular material used as a resistive conductor 220.

Most resistive heater circuits FIG. 2 contain resistive conductors 220 configured as helically wound coils 220, wrapped onto a form, or formed into sinuous loop elements. Some resistive heater circuits FIG. 2 use outward radiating "fins" (not shown here) to provide additional surface area and thereby transmit heat to the surroundings of the heater faster. In the context of the present invention, there may be a metal casing around a particular fuel cell or stack that could itself serve as the resistive conductor 220. Alternatively, if the fuel cell is encased in metal but some other material is used as a resistive conductor 220, it may be necessary to apply an insulating material to the metal casing of the fuel cell prior to placing the resistive conductor 220 in contact with the fuel cell, to avoid electrical "shorting out." Those skilled in the art will appreciate that almost infinite configurations are possible for the resistive conductor 220. The present invention is not limited to any one configuration. One beneficial configuration comprises coiling the resistive conductor 220 around the fuel cell in a manner that most uniformly heats the electrolyte material 120, so that there are no hot spots and cool spots in the electrolyte 120. Hot spots and cool spots would inhibit conduction and thereby decrease the electrical output of the fuel cell.

This method of heating an object is referred to as "resistive heating." Resistive heating is a method used in many heating applications today, including household appliances such as electric stoves, toasters, and space heaters. Resistive heat is generated by the ohmic or resistive losses that occur when electrical current flows through a resistive conductor. In the context of the present invention, the heat generated in the resistive conductor 220 must then be transmitted to the fuel cell by conduction or radiation.

For this method of heating, the maximum heating power can not exceed $$P(R(\max))=I(R(\max))(2)(x)R(c)$$

where $I(R(\max))$ is equal to the maximum current the resistive conductor 220 can carry, $R(c)$ is the resistance per unit length of the resistive conductor 220, and x is the length of the resistive conductor 220. In addition, minimum time to heat up any given fuel cell is governed by $$t(R(\min))=(cM[Dgr]T)/(P(R(\max)))$$

where c is the specific heat of the fuel cell, M is the mass of the fuel cell and [Dgr]T is the change in temperature desired. For resistive heating, total energy losses at the resistive conductor 220 is essentially equal to zero because all of the energy from the power supply that enters the resistive conductor 220 is converted to heat energy, therefore $$P(R(\text{losses}))=0.$$

Figure 3:
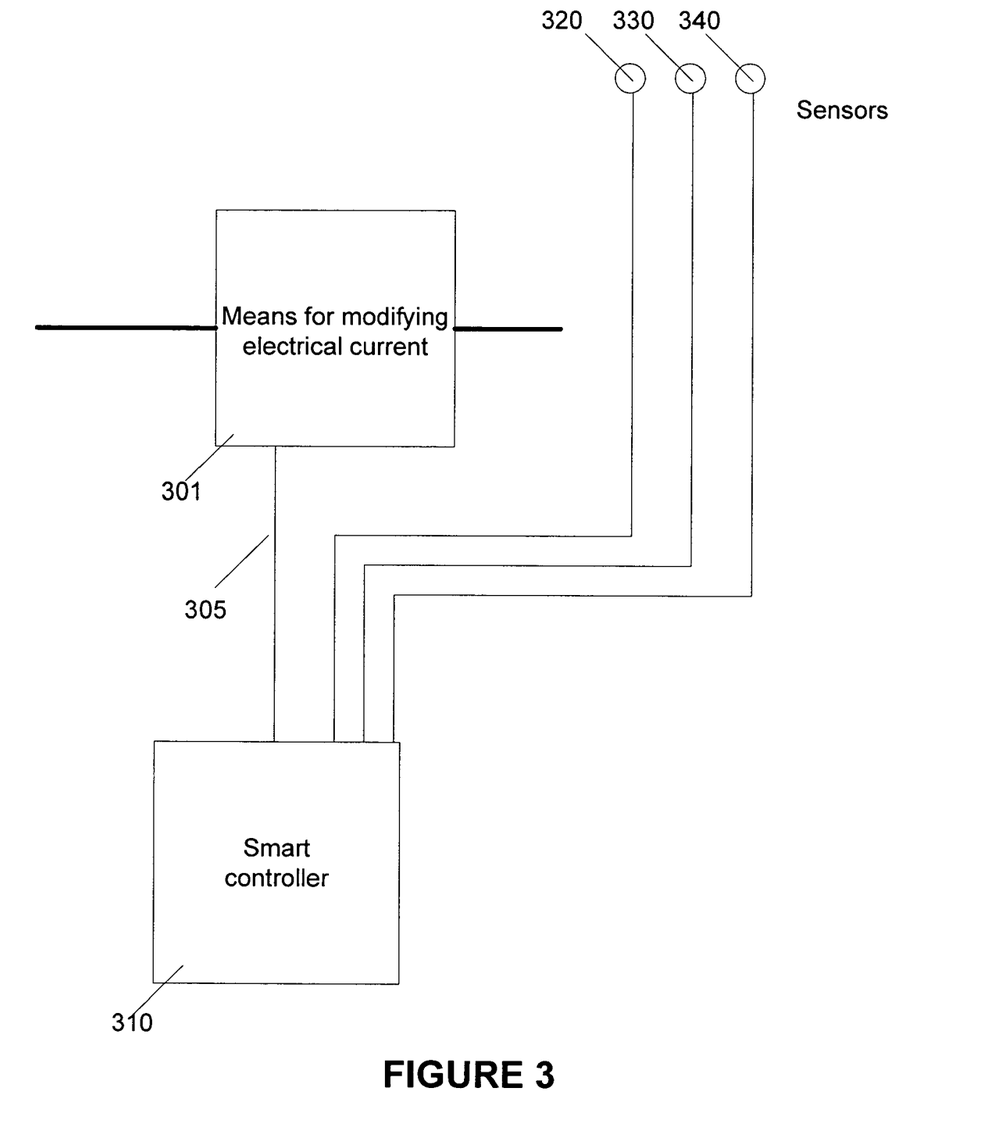
FIG. 3 is an illustration of a system for controlling the electrical current in the resistive heater circuit.

An embodiment of the present invention further comprises a current controller and corresponding mechanism(s) 230 for modifying the electrical current in the resistive conductor 220. The operation of the current controller 230 is illustrated in FIG. 3.

Current controllers 230 are well known in the art of electronics, and a detailed explanation is not helpful here. Suffice it to say that by varying either the resistance of the electrical circuit (as shown in FIG. 2) or the voltage across it, a corresponding change in the electrical current can be accomplished. Therefore structures that could be implemented as a means for modifying electric current include variable resistors, transistors, variable transformers and pulse width modulation schemes. This relationship between resistance, voltage, and current is known as Ohm's Law, which is mathematically described by the following equation:

$$C=V/R$$

where C is the electric current through an electrical circuit, V is voltage, and R is resistance. The present invention can be used with any current controller for modifying electrical current 230, and is not limited to any specific means.

In one embodiment, the current controller for 230 is automated, which can be understood with reference to FIG. 3. The current controller 230 is connected to a "smart controller" 310 via a "connector cable" 305. The smart controller 310 is capable of automatically adjusting the current controller 230 so that any desired current can be established in the resistive conductor 220.

The smart controller 310 is also attached to one or more sensors 320, 330, 340 capable of monitoring various qualities of the fuel cell or accepting inputs from the outside world. Sensor 320 could be, for example, a thermometer that measures the temperature of the electrolyte material in the fuel cell or fuel cell stack. When the temperature of the fuel cell is within the appropriate range for operation of the fuel cell, sensor 320 would send a signal to the smart controller 310, and the smart controller 310 could adjust the amount of electrical current to account for the waste heat generated by the fuel cell or stack of fuel cells.

Sensor 330, could be, for example, an ammeter that measures the electrical current generated by the fuel cell or stack of fuel cells. In this embodiment, sensor 330 could send out continuous information about the electrical output of the fuel cell or fuel cell stack. The smart controller 310 could analyze the information coming from sensor 330, and use that information to determine the ideal current in the resistive conductor 220 (i.e. the current that corresponds to the temperature which maximizes the electrical output of the fuel cell or fuel cell stack).

Sensor 340 could be, for example, a switch that is operated by a human operator. If the present invention were used in an electrical device (a cellular telephone for example) it would be beneficial to allow the owner to shut down operation of the fuel cell or fuel cell stack when the device is not in use. In this embodiment, the smart controller 310 could shut off electrical current in the resistive conductor 220 when the owner switches the device off. The above examples are for the purpose of illustrating that the present invention may be used with a smart controller that is capable of receiving inputs from the outside world, and adjusting the heat of the fuel cell or fuel cell stack accordingly. The present invention is not limited to the examples used here to suggest possible inputs for the smart controller, nor is it limited to the three sensors shown in FIG. 3. Those skilled in the art will recognize that the smart controller is capable of receiving input from any number of sensors.

Figure 4:
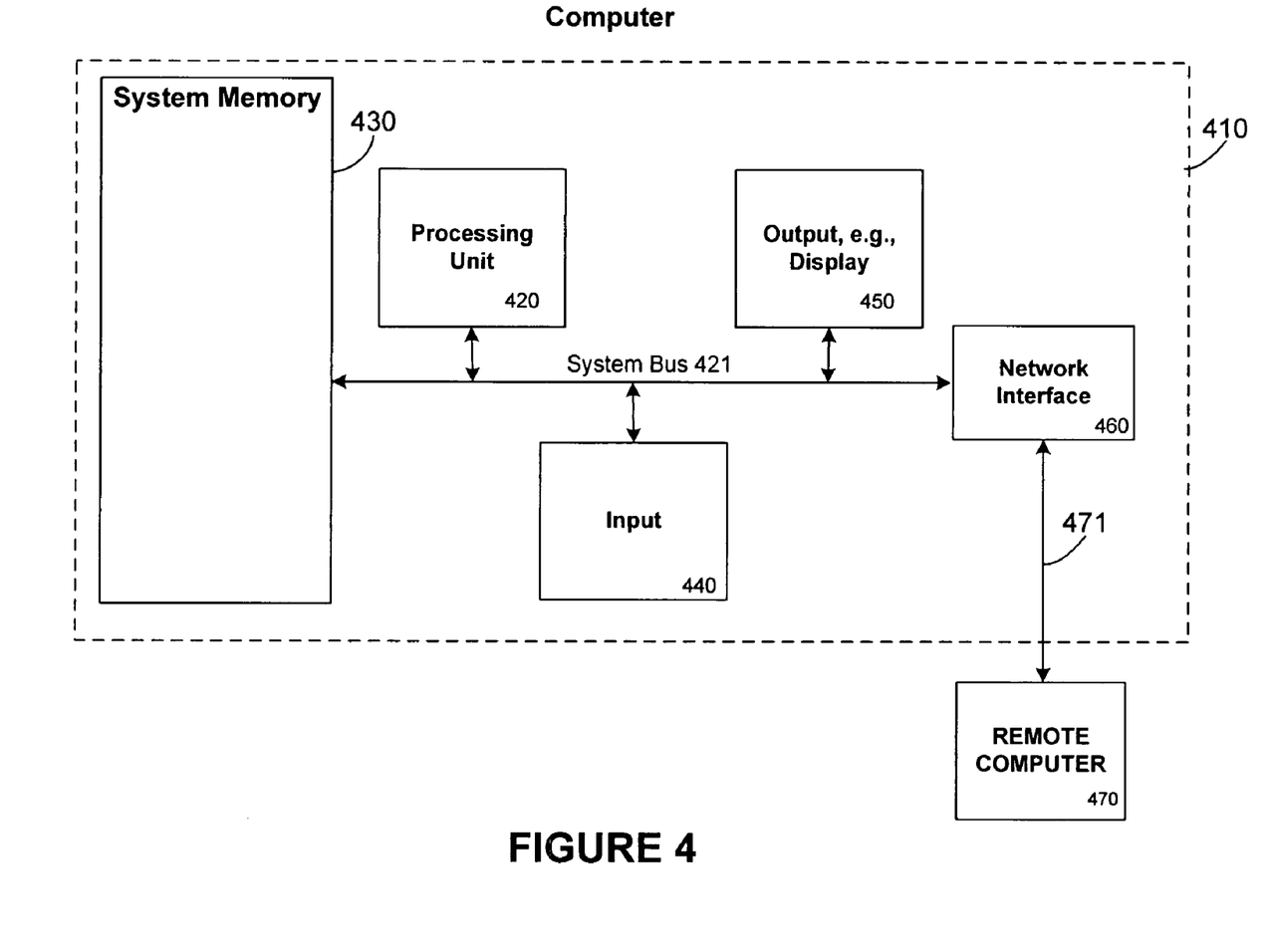
FIG. 4 is diagram of elements of a computer that can be used to automatically control the electrical current in the resistive heater circuit.

In the automated embodiment described here, the smart controller has the basic characteristics of a computer. Components of an exemplary computing device are illustrated in FIG. 4, although it can be appreciated that control electronics can be implemented in a microprocessor, electrically programmable chip, hardware, firmware, software, etc., or any combination of one or more of the foregoing. Components of an exemplary computing device as illustrated in FIG. 4 may or may not include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) and random access memory (RAM). A basic input/output system (BIOS), containing the basic routines that help to transfer information between elements within computer 410, such as during start-up, is typically stored in ROM. RAM typically contains data and/or program modules that are immediately accessible to and/or presently being operated on by processing unit 420.

The computer 410 may also include other removable/non-removable, volatile/nonvolatile computer storage media. By way of example only, computer storage media may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive is typically connected to the system bus 421 through a non-removable memory interface, while magnetic disk drives and optical disk drives are typically connected to the system bus 421 by a removable memory interface.

The computer storage media discussed above provide storage of computer readable instructions, data structures, program modules and other data for the computer 410. For example, a hard disk drive may store an operating system, application programs, other program modules and program data. Note that these components can either be the same as or different from operating system, application programs, other program modules and program data. A user may enter commands and information into the computer 410 through input devices such as a keyboard and pointing device, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor or other type of display device can also be connected to the system bus 421 via an interface, such as a video interface, which may in turn communicate with video memory. In addition to a monitor, computers may also include other peripheral output devices such as speakers and printers, which may be connected through an output peripheral interface (not shown).

The computer 410 may operate in a networked or distributed environment using logical connections 471 to one or more remote computers, such as a remote computer 470. The remote computer 470 may be a personal computer, a server, a router, a network PC, a peer device or other common network node, and typically includes many or all of the elements described above relative to the computer 410, although only a memory storage device. The logical connections 471 may include a local area network (LAN), and a wide area network (WAN), and other networks/buses.

Such networking environments are commonplace in homes, offices, enterprise-wide computer networks, intranets and the Internet.

When used in a LAN networking environment, the computer 410 is connected to the LAN through a network interface or adapter 460. When used in a WAN networking environment, the computer 410 typically includes a modem or other means for establishing communications over the WAN, such as the Internet. The modem, which may be internal or external, may be connected to the system bus 421 via the user input interface 440, or other appropriate mechanism. In a networked environment, program modules depicted relative to the computer 410, or portions thereof, may be stored in the remote memory storage device.

While the automated embodiment of the present invention is likely to arise in the context of consumer electronic devices, there may be other situations in which automation is not desired. FIG. 3 can be alternatively understood as a depiction of the means for modifying electrical current 301 in manual operation mode. In this alternative mode, the "smart controller" 310 is actually a human being. The "connector cable" 305 is a means for adjusting the means for modifying electrical current 301 such as a hand on a dial or switch. The "sensors" 320, 330, 340 could be thermometers, ammeters, or other guages that the smart controller 310 is able to read. Just as the smart controller 310 in automated mode was capable of adjusting the current in the resistive conductor 220 (and thereby the temperature of the electrolyte) in response to inputs from the outside world, the "smart controller" (human being) 310 in manual mode is also capable of this procedure.

Figure 5:
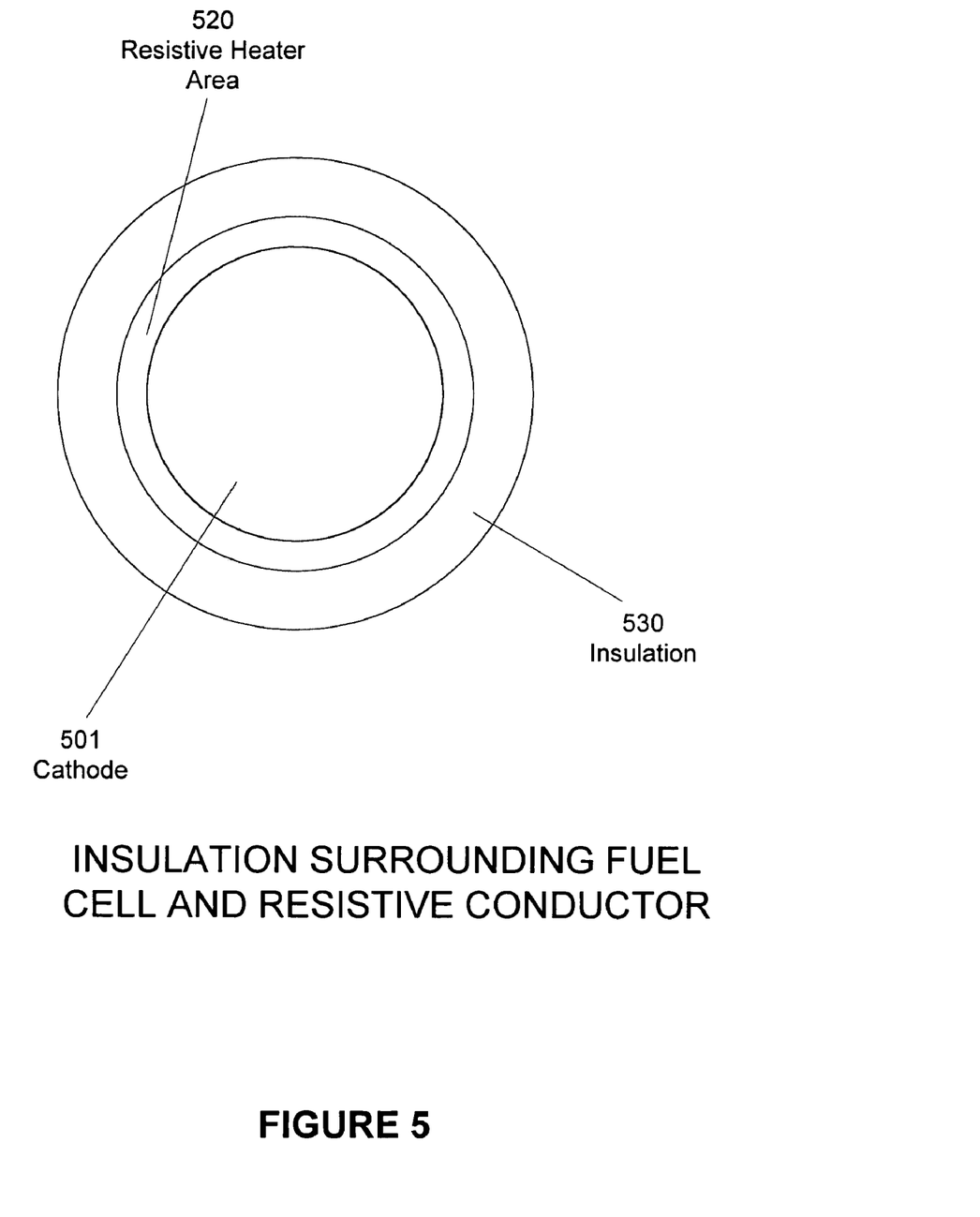
FIG. 5 is a view of one end of a fuel cell with insulation surrounding the fuel cell in accordance with an embodiment of the present invention.

An embodiment of the present invention further comprises insulation that surrounds the fuel cell or fuel cell stack and the resistive conductor 220. FIG. 5 illustrates a layer of insulation 530 surrounding the fuel cell or fuel cell stack (seen in FIG. 5 from the cathode 501 end) in accordance with the present invention. Insulation 530 serves to preserve heat generated by the resistive heater circuit of FIG. 2 and waste heat generated by the fuel cell or fuel cell stack. This makes operation of the resistive heater more efficient. Insulation 530 also serves to protect the nearby environment of the fuel cell (for example, the electronics inside a cellular telephone) from the heat of the fuel cell or fuel cell stack.

FIG. 5 shows a resistive heater area 520 between the fuel cell (as seen from the cathode 501 end) and the insulation 530. The resistive heater area 520 is designed to accommodate the resistive conductor 220. The resistive heater area 520 can be any size, and in many applications of the present invention the area will likely be reduced to the point where the insulation 530 is actually in contact with the resistive conductor 220 that is configured around the fuel cell or fuel cell stack.

While insulation 530 is preferable in many limited space environments, the thickness, type of insulating material, and coverage of the insulation 530 may vary. The insulation 530 "surrounds" the fuel cell or fuel cell stack, meaning that it provides sufficient coverage to modify either the temperature of the fuel cell or the temperature of the nearby environment. "Surrounds" is not used here to mean that the insulation 530 must completely enclose the fuel cell or stack, although complete enclosure is certainly one possible embodiment of the present invention.

The insulation 530 may be made from any of a wide selection of materials, including materials that perform other functions alongside the insulation of the fuel cell and resistive heater circuit FIG. 2. By way of example, and not limitation, the insulation could be a sprayed-on polyurethane foam, a mineral fiber blanket, a rock wool blanket, or a slag wool blanket that is wrapped around the fuel cell, a vacuum area, a ceramic casing, a fiberglass casing, a cellulose casing, or a radiant barrier.

Figure 6:
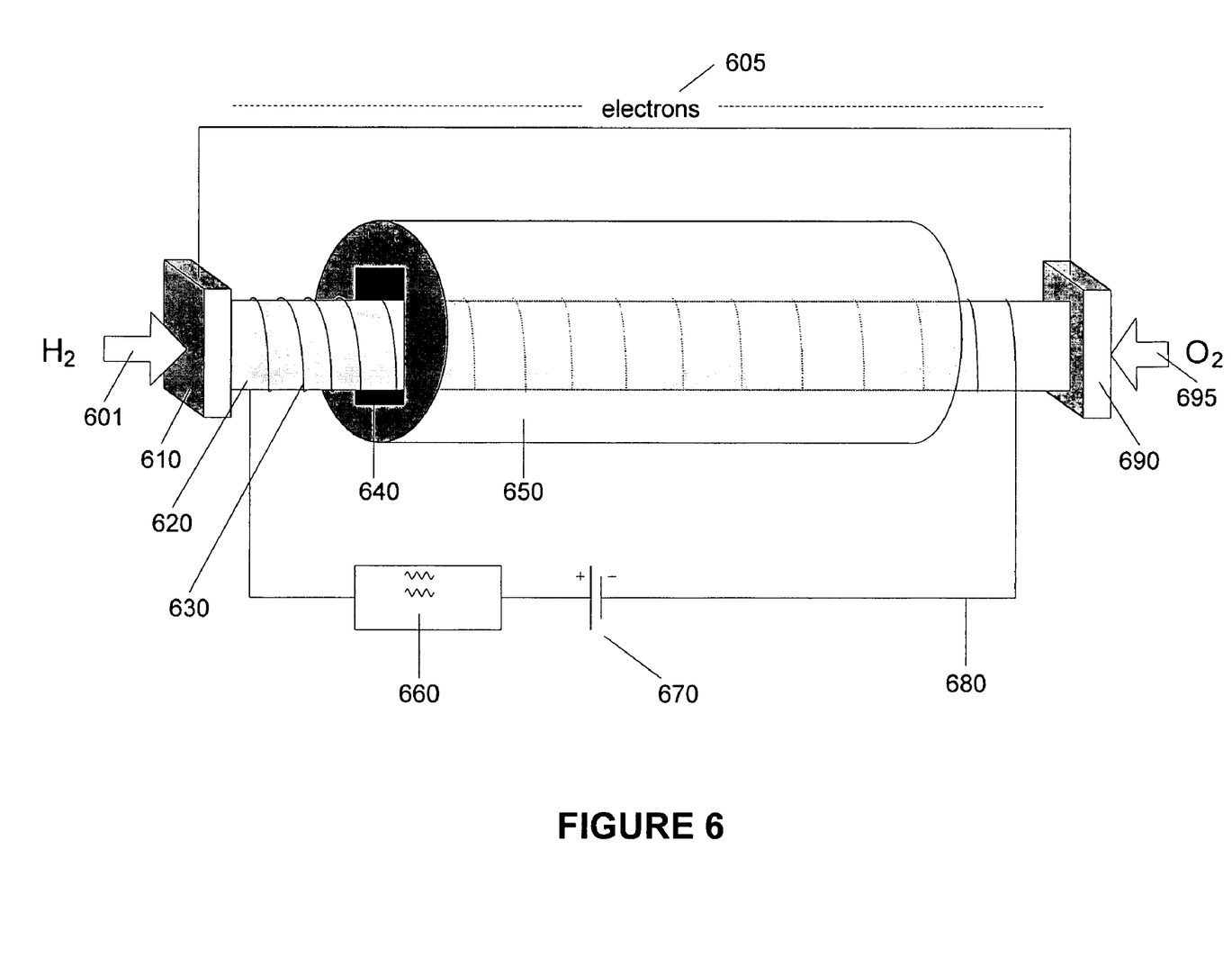
FIG. 6 is an illustration of the combination of a fuel cell, a resistive heater circuit, a current controller, and surrounding insulation.

A preferred embodiment of the present invention is displayed in FIG. 6. FIG 6 combines aspects of the present invention set forth in the previous figures to provide a complete picture of an embodiment of the invention. FIG 6 provides a Solid Oxide Fuel Cell (SOFC) or fuel cell stack comprising an anode 610 into which Hydrogen 601 may be fed, a cathode, 690, into which Oxygen 695 may be fed, and an electrolyte 620. A copper wire 630 serving as the resistive conductor 220 is coiled around the electrolyte 620. The copper wire 630 is connected via connecting wire 680 to a battery 670. Insulation 650 surrounds the electrolyte 620 coiled with copper wire 630. A variable resistor 660 capable of automatically controlling the current in the heater circuit (as illustrated in FIG 3) is placed along the connecting wire 680.

Figure 7:
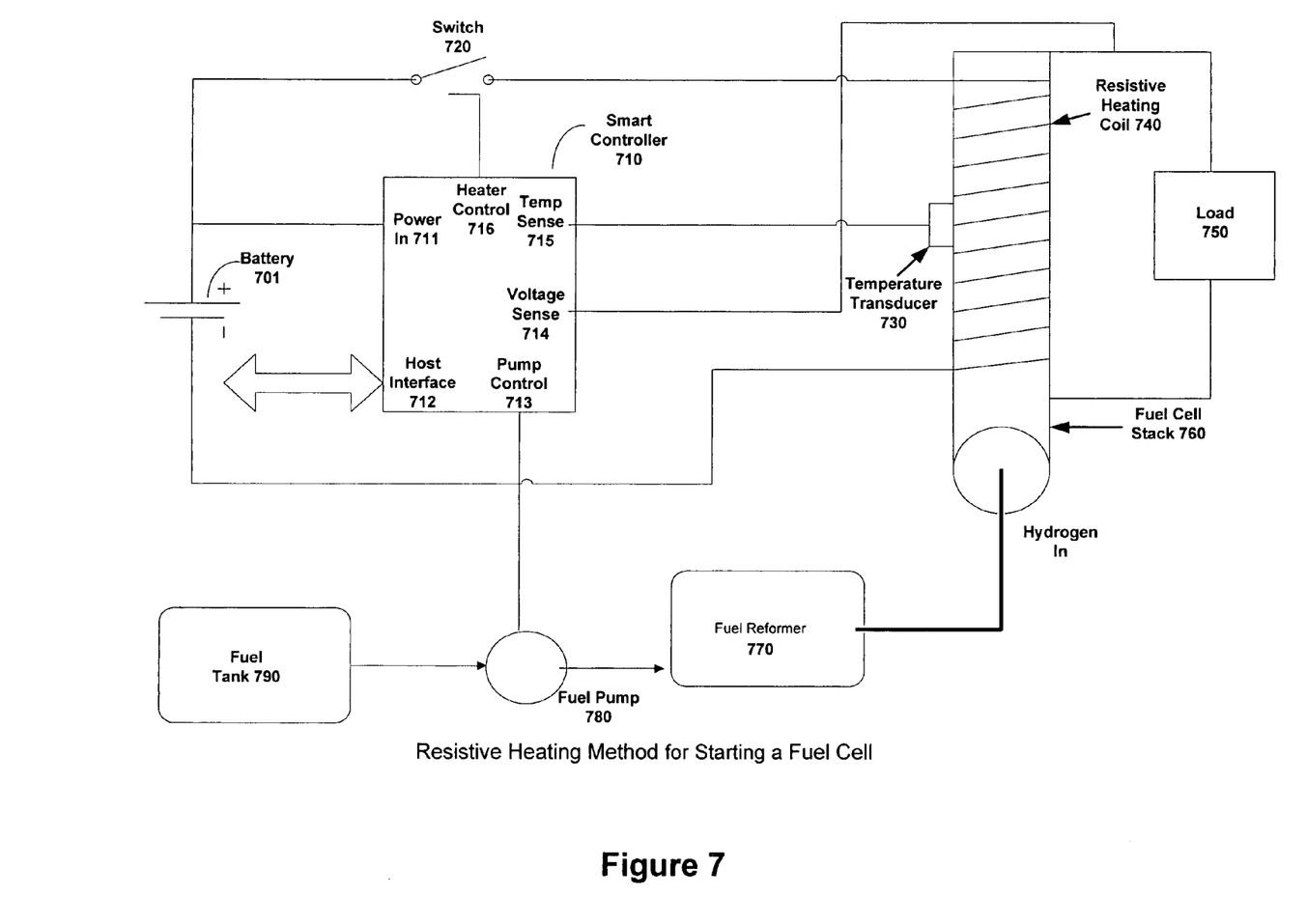
FIG. 7 represents various embodiments in which the present invention is used in conjunction with a smart controller capable of modifying fuel cell temperature, fuel flow, and electrical output, and can be in communication with other electronics through a host interface.

Referring to FIG. 7, the present invention is further described in conjunction with an embodiment of a smart controller 710, which may be preferable in settings in which the invention is directed to techniques for "starting" fuel cells in mobile power applications. Previously fossil fuel burners and catalytic heaters were used to heat fuel cells. For example, solid oxide fuel cells need to be heated to the 600°–800° C. range to initiate appropriate electricity production. Here, a smart microcontroller, computing device, firmware, software, programmable computing device or similar controlling device is used to start and monitor the warm-up sequence of a fuel cell. The resistive heating coil 740 of FIG. 7, for example, may be understood as the resistive conductor 220 in FIG. 2. Similarly, smart controller 710 may be understood as an alternate version of the smart controller 310 in FIG. 3.

FIG. 7 shows a resistive heating coil 740 wound around the fuel cell stack 760. This coil 740 may be wound around each individual cell in the stack 760. A temperature transducer 730 may be attached to the outside of the stack 760 or may be attached to the exterior of a single fuel cell. Note that FIG. 7 does not display insulation surrounding the fuel cell stack 760. This is for simplicity of presentation, clearly the insulation as taught in the other figures can be incorporated into a system such as that of FIG. 7. The temperature transducer 730 can be placed inside any insulation, embedded in the insulation, or on the exterior of any insulation, so long as it is capable of taking a measurement that can be used to determine the heating requirements of the fuel cell stack 760.

The heater control 716 of FIG. 7 may be integrated with the control electronics 711, 712, 713, 714, 715 (as shown here) for the fuel cell stack 760 or may be a discrete component (not shown here). A switch 720 may be connected to the smart controller 710 and will interrupt the power connection from the power supply 701 (shown here as a battery) to the resistive heating coil 740. The battery 701 may be integrated into the fuel cell pack (not shown here) or may be an external component, as shown on FIG. 7.

The smart controller 710 may be connected to a host system via host interface 712 and may include inputs for voltage 714 and temperature sensing 715. The smart controller 710 may also include output control for the switch 716 (i.e. the heater control) and a pump control 713 for the fuel pump 780, which may, for example, pump fuel from the fuel tank 790 to the fuel reformer 770.

The operation of the embodiment of the invention as illustrated in FIG. 7 begins with notification (from some source, either human or automatic, electronic or mechanical) to the smart controller 710 to start the fuel cell stack 760. The smart controller 710 may then close the heater switch 720 and begin to monitor the temperature of the fuel cell stack 760. As the temperature of the fuel cell stack 760 approaches its normal operating range, the smart controller 710 begins pumping fuel into the fuel reformer 770 and hydrogen begins flowing from the fuel reformer 770 into the fuel cell stack 760. The smart controller 710 also begins to monitor the output voltage of the fuel cell stack 760. When the fuel cell stack 760 output voltage and temperature reach their normal operating ranges, the smart controller 710 turns off the heater switch 720. From this point, waste heat generated by the fuel cell stack 760 may optionally be used to keep it at operating temperature. Waste heat generated by the fuel cell stack 760 may also optionally be used when warming up the stack 760 to operating temperature.

The invention claimed is:

1. An apparatus for heating at least one fuel cell to an optimized operating temperature, comprising:
    a resistive conductor attached to a source of electricity, said resistive conductor being configured for close proximity to at least one fuel cell;
    a smart controller for automatically optimizing an amount of electrical current in said resistive conductor so as to maintain said at least one fuel cell at an optimized operating temperature, said smart controller comprising:
        at least one voltage sensor for measuring an output of the at least one fuel cell;
        at least one temperature sensor for monitoring a temperature of the at least one fuel cell;
        at least one heater control component that modifies the amount of electrical current in said resistive conductor so as to optimize said output of the at least one fuel cell; and
    a host interface for communications between said smart controller and a consumer electronic device that is powered by said fuel cell.

2. An apparatus according to claim 1, wherein the at least one fuel cell comprises at least one fuel cell stack.

3. An apparatus according to claim 1, wherein said resistive conductor contains metal.

4. An apparatus according to claim 1, wherein said source of electricity is at least one of a battery, a fuel cell, and a power cord attached to a conventional wall plug.

5. An apparatus according to claim 1, further comprising at least one temperature transducer communicatively coupled to said temperature sensor.

6. An apparatus according to claim 1, wherein said voltage sensor includes at least one ammeter.

7. An apparatus according to claim 1, further comprising an insulating material configured to surround said at least one fuel cell and said resistive conductor.

8. An apparatus according to claim 1, wherein said at least one heater control component includes a switch capable of switching electrical current on and off.

9. An apparatus according to claim 1, wherein said at least one fuel cell includes at least one solid oxide fuel cell.

10. An apparatus according to claim 1, wherein said smart controller further comprises a pump control for controlling fuel delivery into the at least one fuel cell.

* * * * *